S. UTTER.
Cooking Stove.
No. 349.  Patented Aug. 8, 1837.
Section from front to back
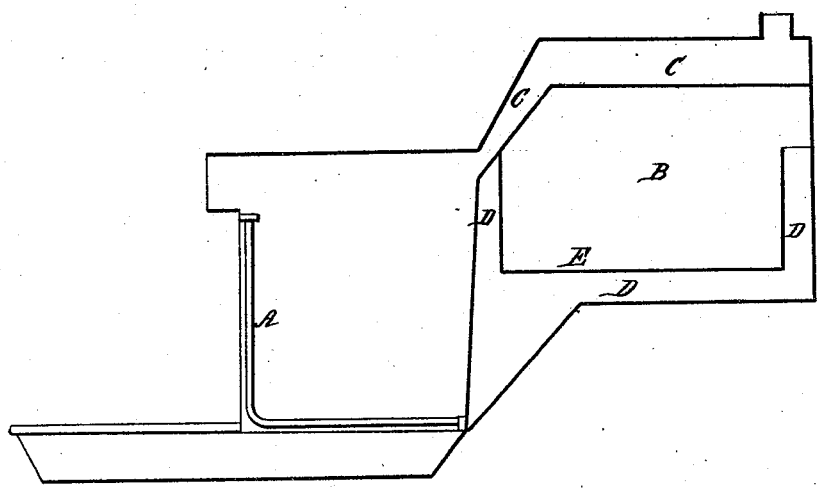

UNITED STATES PATENT OFFICE.

SAMUEL UTTER, OF NEW YORK, N. Y.

COOKING-STOVE.

Specification of Letters Patent No. 349, dated August 8, 1837.

*To all whom it may concern:*

Be it known that I, SAMUEL UTTER, of the city of New York, have invented a new and useful Improvement in Cooking-Stoves, which improvement is applicable principally to those stoves in which anthracite is used as fuel, but which may be applied in other stoves that are furnished with ovens; and I do hereby declare that the following is a full and exact description thereof.

I do not intend to confine myself to any particular size, or construction of stove, as my improvement is independent of these particulars; all that is necessary is that there should be either an open grate, or a close stove, for containing and burning the fuel, and that behind, or above, the fire, there be an oven in which articles are to be baked; the most suitable situation of the oven, however, is behind, and in part above, the fire-place, as shown in the drawing.

The cast-iron stove in which I have essayed my improvement consists of an open grate, A, above which there are openings to receive cooking utensils, and behind, and in part above, which, my oven B is situated. The upper plate above the oven is also perforated for cooking utensils in the usual way; the draft from the fire passes up in front, and over the top of the oven, as at C, C, to the ordinary stove pipe, or flue. The lower part of the front of the oven, its under side, and also its back, to a certain height, is formed of double plates, constituting, with the external plates, an air-chamber D, D, for heated air, but forming no part of the flue, the whole intention of this air-chamber being to contain air which shall be heated by the burning fuel, and pass thence into the oven. To admit this air freely into the oven, perforations are made through the bottom plate thereof, which divides it from the air-chamber, which perforations may consist of a number of small holes, slots, or other openings, which will effect the same purpose.

What I claim as my invention, and wish to secure by Letters Patent, is—

The constructing and heated air chamber under, and at the ends of, the oven of a cooking stove, which chamber is unconnected with the flues that pass over, or around, the oven; and which air, when heated by the fire in the stove, or grate, is admitted freely into the oven through openings made in the bottom plate thereof for that purpose. It is to be understood that I do not claim the construction of a chamber for heating air, excepting in connection with the openings in the bottom plate of the oven through which it is to pass, this being its sole use.

SAMUEL UTTER.

Witnesses:
  THOS. P. JONES,
  W. THOMPSON.